Feb. 10, 1953 K. SCHLESINGER 2,628,276

SYNCHRONIZING PULSE DIFFERENTIATING AND RECTIFYING CIRCUIT

Filed July 20, 1949 2 SHEETS—SHEET 1

INVENTOR.
Kurt Schlesinger
BY
Foorman L. Mueller
Atty.

Inventor
Kurt Schlesinger
By
Foorman L. Mueller
Atty.

Patented Feb. 10, 1953 2,628,276

UNITED STATES PATENT OFFICE 2,628,276

SYNCHRONIZING PULSE DIFFERENTIATING AND RECTIFYING CIRCUIT

Kurt Schlesinger, Maywood, Ill., assignor to Motorola, Inc., Chicago, Ill., a corporation of Illinois Application July 20, 1949, Serial No. 105,847

2 Claims. (Cl. 178—7.3)

Figure 1:
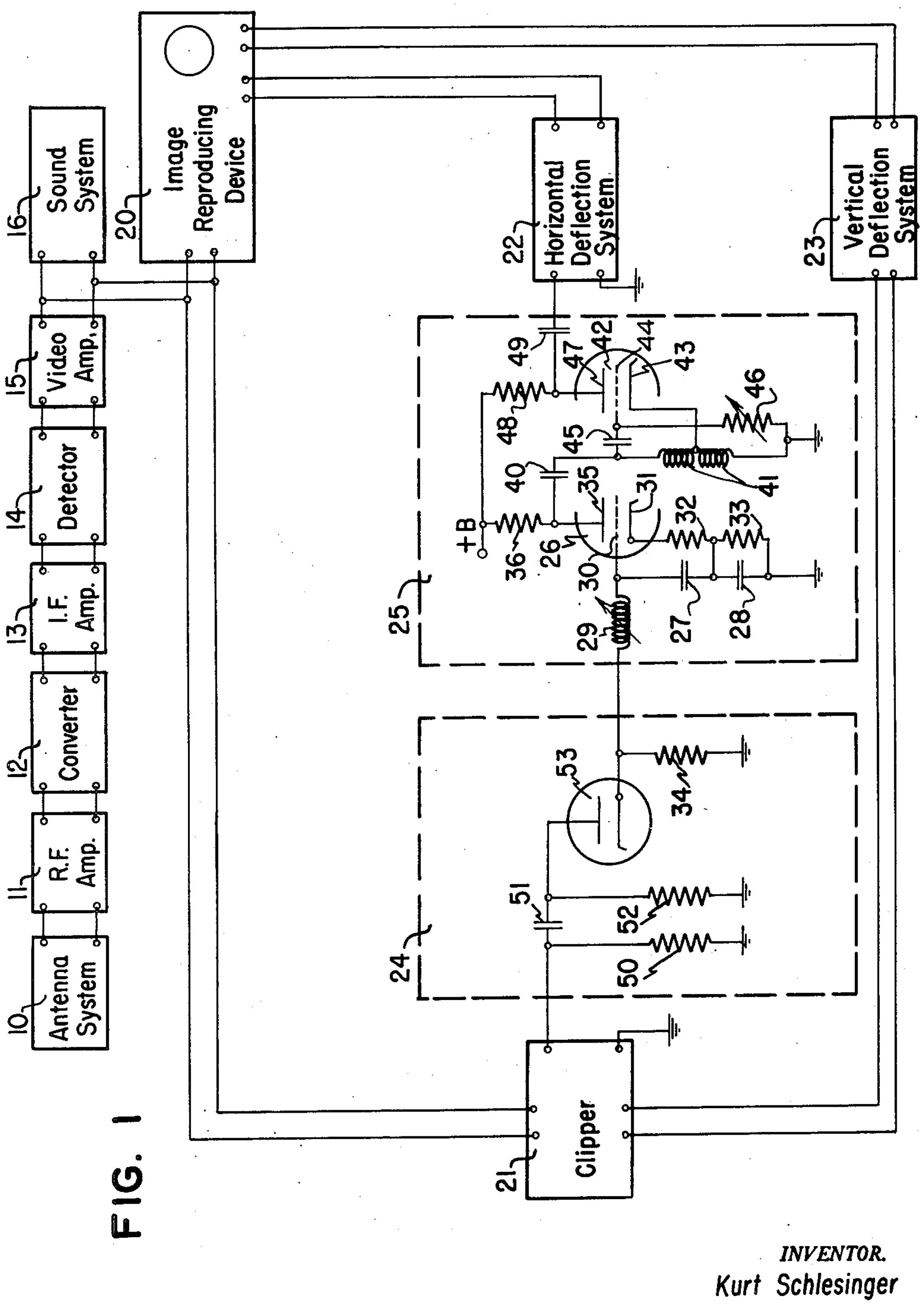

This invention relates generally to synchronization systems and more particularly to a television synchronization system in which the pulse wave including both horizontal and vertical synchronization pulses is processed so that the vertical pulses do not substantially affect the deflection system synchronized with the horizontal pulses.

It has been found that the synchronization pulses which are received in a television receiver are affected by noise and are subject to other variations so that direct control of the scanning system thereby is not satisfactory. Such variations have caused difficulties in particular with horizontal synchronization which controls the individual lines in the reproduced picture. Various systems have been provided in an attempt to overcome these difficulties including automatic frequency control systems for controlling the horizontal deflection systems from the synchronization signals without directly controlling the deflection system by each synchronization pulse. A system has also been developed in which an oscillator is locked-in with the received synchronization signal but not positively synchronized with each individual pulse. Such a system has been disclosed in my copending application, Serial No. 52,243, filed October 1, 1948, subject: Synchronization System.

Such systems, which produce pulse waves corresponding to the horizontal synchronization pulses of a television signal, have been highly successful in eliminating variations in the synchronization signals produced by noise and the like. However, it has been found that the vertical synchronization pulses which occur intermittently, and which have different phase relationships with respect to the horizontal synchronization pulses for alternate frames of the picture, interfere with proper horizontal synchronization even when using systems as mentioned above. The vertical synchronization pulses are of relatively long duration and therefore contain a relatively lareg amount of energy which causes a substantial effect on the deflection system controlled thereby. This has resulted in flutter at the top of the picture due to disturbance of the deflection system at the beginning of each field of the picture.

It is, therefore, an object of this invention to provide a system for processing synchronization signals so that horizontal synchronization is not substantially disturbed by the vertical synchronization pulses.

It is a further object of this invention to provide a system for processing received television synchronization pulses so that the equalization and vertical pulses have relatively small energy and appear alike at each field in the reconstructed television image.

A still further object of this invention is to provide a system for producing regularly spaced pulses occurring at the line repetition rate of a television signal, which system is not affected by the pulses occurring at the frame repetition rate of the signal.

A feature of this invention is the provision of a system for processing received television synchronization pulses before they are used, which changes the form of the vertical pulses so that these pulses do not interfere with synchronization of the horizontal deflection system with the horizontal synchronization pulses.

A further feature of this invention is the provision of a differentiating and rectifying system for reducing the energy of undesired received synchronization pulses and rendering these pulses substantially alike at each occurrence so that the undesired pulses will not substantially affect synchronization with the desired pulses of the received signal.

Figure 2:
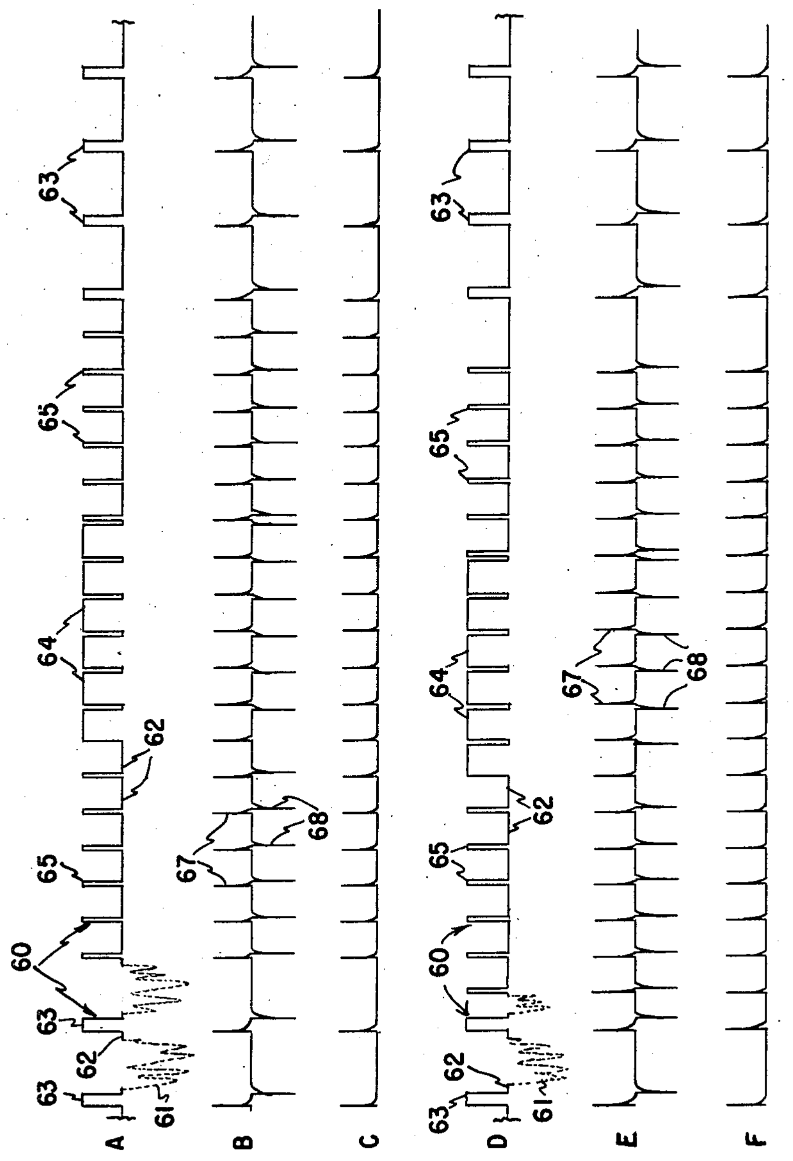

Further objects and features of this invention will be apparent from a consideration of the following description taken in connection with the accompanying drawings in which:

Fig. 1 illustrates the use of the synchronization system in accordance with the invention in a television receiver; and Fig. 2 illustrates the operation of the differentiating and rectifying system for processing the received synchronization signal.

In practicing the invention, a television receiver is provided having a horizontal deflection system which is controlled by the horizontal synchronization pulses of the received television signal. This control may be provided through an oscillator which is locked-in with received synchronization pulses so that the frequency of the oscillator is equal to the average repetition rate of the received pulses. The locked-in oscillator tends to run at constant frequency to thereby remove phase variations in the received pulse wave and also has constant output amplitude so that the amplitude variations in the received wave are effectively eliminated. In order to reduce the effect of the vertical synchronization pulses on the horizontal deflection system, the synchronization signal is processed by first differentiating the pulses and then rectifying them so that only pulses of positive (or negative) polarity are provided. This is effective to reduce the energy of the vertical synchronization pulses which are of relatively long duration and also modifies the pulses, which occur after each field and which in alternate fields have different phase relationships with the horizontal synchronization pulses, so that these pulses are substantially identical. The time constant of the differentiating circuit must be equal to or less than the duration of the shortest pulses (equalization) so that the output is the same from all the pulses.

Referring now to the drawings, in Fig. 1 there is illustrated in block diagram a television receiver with the improved synchronization control system shown in detail. The receiver includes an antenna system 10 arranged to intercept and select signals of predetermined frequencies. The signals from the antenna system are applied to radio frequency amplifier 11 wherein the signal strength is increased and the signals are further selected. The radio frequency signals are reduced to intermediate frequency by converter 12 and applied to intermediate frequency amplifier 13 in which the signal level is further increased to a great extent. The sound and video signals may be removed from the radio frequency signal by detector 14 and then further amplified in video amplifier 15. A sound system 16 may be coupled to the video amplifier in the event that an intercarrier sound system is used or may be connected directly to the intermediate frequency amplifier if the video and sound signals are separately derived.

The video signal from amplifier 15 is applied to image reproducing device 20 wherein it is used for modulating the beam of a cathode ray tube or like device. The synchronization signals are also applied to clipper 21 which removes excess amplitudes. At its output, the synchronization signals are applied to the horizontal and vertical deflection systems 22 and 23 for controlling the frequency thereof. A signal processing circuit 24 and a locked-in oscillator 25 are coupled between the clipper 21 and the horizontal deflection system 22 for improving the synchronization pulses applied thereto. The horizontal and vertical deflection systems may provide scanning currents or voltages for deflecting the beam of the image reproducing device 20, depending on whether an electromagnetic or an electrostatic deflection system is used.

The locked-in oscillator 25 is described in detail in my copending application referred to above and will be described generally herein. This oscillator is of the Colpitts type and includes a high mu triode section 26 and a resonant tank circuit with equal capacitors 27 and 28 for providing feedback and a variable tuning inductor 29. The tank circuit is connected to the grid 30 and the cathode 31 of the triode, with the grid 30 being connected to the common terminal between capacitor 27 and inductor 29. The cathode 31 is connected to ground through resistors 32 and 33, the common connection between which is connected to the common connection between the capacitors 27 and 28. A resistor 34 is provided in the tank circuit and the signal for controlling the oscillator is applied across this resistor. Operating potential is applied to the plate 35 of the triode 26 through dropping resistor 36. The output from the triode 26 is applied through coupling condenser 40 across the transformer 41. This transformer serves the double purpose of differentiating the pulse wave from the oscillator and providing coupling for a blocking oscillator as will be more fully explained. The blocking oscillator is formed by the triode section 42 which may be combined in the same envelope as the triode section 26. Coupling is provided between the cathode 43 and the grid 44 through the winding 41 which has a tap connected to the cathode 43 and which is connected to the grid 44 through capacitor 45. Variable resistor 46 is provided for fine control of the phase of the sawtooth output wave produced by the blocking oscillator. Operating potential is applied to the plate 47 of the tube 42 through resistor 48 and the sawtooth voltage wave is applied through coupling condenser 49 to the horizontal deflection system 22, which may provide a sawtooth current wave from the sawtooth voltage wave applied thereto.

As previously stated, synchronization pulses are provided from the clipper 21 to the locked-in oscillator 25 through a processing system 24 including a differentiating circuit and a rectifier. In the system described positive synchronization pulses as shown in Fig. 2A are produced by the clipper and are applied across the resistor 50. These pulses are differentiated by the circuit including capacitor 51 and resistors 50, 52 and 34 with the differentiated pulses appearing across resistor 34. The differentiated wave thus appearing across resistor 34 has been rectified by the diode 53 which removes the negative portions of the differentiated wave as a diode will conduct only on positive signals. The rectified portions of the differentiated wave are then applied across resistor 34 and control the locked-in oscillator 25.

In considering the operation of the synchronization signal processing system 24, it is necessary to consider the form of the video signal. The standard video signal includes synchronization pulses 60 and picture components 61. (See Fig. 2.) The synchronization pulses are provided on pedestals 62 which have such an amplitude that the beam of the tube of the television receiver is extinguished thereby. This generally is referred to as the "blanking" or the "black" level. The synchronization pulses extend above this level so that they do not appear in the reproduced picture. The synchronization pulses occur at different predetermined intervals and are of different configurations. The horizontal deflection pulses 63 occur at the end of each line in the television picture. In the standard television signal the time interval between the horizontal synchronization pulses is about 63 microseconds. The duration of the horizontal pulses is one-tenth of the time interval between pulses or approximately 6.3 microseconds. For synchronizing the fields in the television picture vertical synchronization pulses 64 are provided which occur at the end of each field or at time intervals of one-sixtieth of a second. The vertical pulses occur over an interval equal to three horizontal lines and are constituted by six identical and regularly spaced pulses each of which has a duration of about 27 microseconds. The vertical pulses therefore have a repetition rate of twice the repetition rate of the horizontal pulses but occur during only a small portion of the time. The horizontal pulses do not appear during this interval of time and are also absent for a space equal to three lines before and after the vertical synchronization pulses. In this space there are provided equalization pulses 65 which have a repetition rate twice that of the horizontal pulses and which are of very short duration having a time duration of about three microseconds. The vertical and equalization pulses are provided on a blanking pedestal of relatively long duration. The vertical pulses and the equalizing pulses therefore both occur at a repetition rate twice that of the horizontal pulses. The leading edges of the vertical and equalizing pulses occur either in phase with the leading edges of the horizontal pulses or are substantially half way between the normal positions of the leading edges of the horizontal synchronization pulses.

The phase relationship of the equalizing and vertical pulses differs after alternate fields in the television picture. This is because the standard scanning pattern has 525 lines and the first field in each frame ends on a half line, that is, after the 262½ line. Therefore, the vertical blanking period at the end of the first field in each frame starts after a half line so that the first equalization pulse is not in phase with the horizontal synchronization signal but is out of phase with respect thereto. Likewise, the first vertical pulse is out of phase with the horizontal pulses. This is illustrated in curve D in which the components of the composite video signal are designated by the same numbers as in curve A.

When the video signal is passed through the clipper, the picture components are removed. The signal therefore which is applied to the deflection systems corresponds generally to the solid portions of curves A and D. Synchronization of the horizontal deflection system with the horizontal pulses 63 will necessarily be upset by the presence of the vertical pulses and equalizing pulses which occur at twice frequency. The vertical pulses are particularly bothersome as they are of relatively long duration so that they contain a large amount of energy, and have different phase relationships with the horizontal pulses at the ends of alternate fields. When applying a signal as illustrated in curves A and D to a synchronization system, the high energy vertical pulses cause a disturbance of the oscillator or other synchronized unit which may produce flutter at the beginning of each field in the reproduced television image. Due to the different phase relationship this flutter is at 30 cycles and is therefore very disturbing. This has been observed particularly in the locked oscillator synchronization systems as disclosed, but is also present to a more or less degree in other synchronization systems. This disturbance is particularly objectionable in directly synchronized systems.

It has been found that the disturbance or perturbation caused by the vertical deflection pulses and the associated equalizing pulses can be reduced and rendered less objectionable by differentiating and rectifying the pulses. This is performed by the processing circuit 24 of Fig. 1 and the resulting pulse waves are illustrated in curves B, C, E and F. The differentiating circuit of the processing system has a time constant such that complete differentiation is provided for the shortest pulses, that is, the equalization pulses. Referring to the circuit of Fig. 1, the time constant of resistor 34 taken with condenser 51 must be three microseconds or less. This provides pulses of equal amplitude and width at the leading edges of the synchronization pulses. As illustrated by curve B, differentiation of the pulse wave produces positive pulses 67 at the leading edges and negative pulses 68 at the lagging edges of the synchronization pulses. As previously stated, the equalizing and vertical pulses occur at twice the frequency of the horizontal pulses, and the leading edges thereof either correspond in time with the leading edges of the horizontal pulses, or are substantially half way therebetween. Therefore, the leading edges of the vertical and equalizing pulses produce a uniformly spaced wave of pulses occurring at twice line frequency, there being 18 pulses in all. The lagging edges of the synchronization pulses however do not provide a uniform pulse wave due to the varying duration of the vertical, equalizing, and horizontal pulses. It has therefore been found desirable to remove the negative pulses produced by the lagging edges and this is performed by the rectifier 53 of the processing circuit. As the negative pulses are removed and not used, the shape of these pulses is not important. Resistor 52 must have a value to discharge condenser 51 between pulses so that the condenser does not bias the diode out of action. Curve C illustrates the positive portion of the differentiated wave. Curve E illustrates the pulse wave produced by differentiating the signals of curve D which occur at the end of the first field in each frame.

Curve F illustrates the positive portion of the differentiated wave. Due to the time constant of the differentiating circuit the differentiated wave will have uniform pulse amplitude and width, and the positive portions produced by the leading edges will be uniformly spaced and of twice the frequency of the horizontal synchronization pulses. A careful consideration of the waves of curves C and F will show that the changes or perturbations produced at the ends of the alternate fields are substantially identical. The pulse wave has double frequency for a period of nine lines but these double frequency pulse waves which are of short duration do not substantially disturb an oscillator synchronized by the pulse wave of fundamental frequency. The disturbance is minimized by the fact that the perturbations are now repetitive and identical so that there is no 30 cycle disturbance caused by the difference which occurs at alternate fields. The differentiated pulses which are out of phase have relatively small energy as compared to the original vertical synchronizing pulses so that the out-of-phase components will not have a substantial effect as did the out-of-phase vertical pulses which contained a large amount of energy.

The processed wave is applied to the tuned circuit of the Colpitts oscillator. The operation of the oscillator is described in my copending application referred to above. The oscillator produces an output current wave which is differentiated by the transformer 41 to produce a pulse wave which is used for controlling the blocking oscillator. As previously stated, the transformer 41 is also used for providing the feedback required for the usual blocking oscillator operation. The resistor 46, provided between the grid 44 and ground, controls the phase shift in the blocking oscillator so that the sawtooth wave produced thereby has the proper phase relationship with respect to the synchronization signals provided by the clipper 21. By processing the synchronization signal before the application thereof to the horizontal deflection system, the vertical synchronization pulses which differ in alternate fields do not substantially disturb the operation of the oscillator. As illustrated by curves C and F, the equalizing pulses 65 and vertical synchronization pulses 64 both cause differentiated pulses 67 which occur at twice line frequency. These pulses have very small energy and do not seriously affect the operation of the locked-in oscillator.

Although a diode tube rectifier is illustrated at 53, it is obvious that other methods may be used. A germanium crystal rectifier has been found to be entirely satisfactory, and the required rectification can also be provided by a triode. In this instance, the triode may also provide gain in level of the synchronization signal. The values of the various components illustrated in the processing system are not unduly critical but must provide the required time constant for the differentiating circuit as stated above. The following values have been found to operate satisfactorily and are suggested:

| | |
|---|---|
| Resistor 50 | 1000 ohms |
| Condenser 51 | .002 microfarads |
| Resistor 52 | 10,000 ohms |
| Diode 53 | ½ 6AL5 |
| Resistor 34 | 470 ohms |

The signal processing system, although illustrated in connection with a locked-in oscillator controlled deflection system, is not limited to use in such a system. The processing system would be very advantageous for use with a deflection system synchronized directly with the synchronization signals. The system reduces the effect of the vertical synchronization pulses by reducing the energy thereof and by rendering the pulses substantially identical so that the effect thereof is reduced and can be more easily compensated for.

Although the embodiment of the invention illustrated herein is illustrative thereof, it is obvious that various changes and modifications can be made therein without departing from the intended scope of the invention as defined in the appended claims.

I claim:

1. In a television receiver including means for deriving a synchronization signal including horizontal synchronization pulses having a predetermined duration and a given repetition rate interspersed with intermittent vertical synchronization pulse serrations having a longer duration and equalizer pulses having a shorter duration, and with the vertical pulse serrations and equalizer pulses having a repetition rate twice that of said horizontal synchronization pulses and having a phase relationship which differs with respect to the phase of said horizontal synchronization pulses on alternate occurrence of said intermittent pulses, and which receiver includes a horizontal scanning system controlled by said horizontal synchronization pulses; a circuit for providing pulses for controlling said horizontal scanning system including in combination, a differentiating circuit having a time constant no longer than said equalizer pulses for producing pulses of one polarity of coequal short duration at the leading edges of all said synchronization pulses, said differentiating means including condenser means and first resistor means connected in series across the synchronization signal deriving means, and rectifying means and second resistor means connected in series with each other and connected as a unit in series with said condenser means and in parallel with said first resistor means, said condenser means and said second resistor means having such values that the pulses produced across said second resistor means at the leading edges of said synchronization pulses have a duration less than said equalizer pulses, said first resistor means having a value to discharge said condenser means between pulses, said rectifier eliminating the opposite polarity pulses produced at the lagging edges of said synchronization pulses, a sine wave oscillator having a natural frequency equal to the frequency of said horizontal synchronization pulses, means coupling said oscillator to said second resistor for locking said oscillator with the pulses of horizontal frequency, with the short duration pulses occuring between the pulses of horizontal frequency having no substantial effect on said oscillator, and second differentiating means connected to said sine wave oscillator for producing horizontal sweep pulses from the sine wave output thereof.

2. In a television receiver including means for deriving a synchronization signal including horizontal synchronization pulses having a predetermined duration and a given repetition rate interspersed with intermittent vertical synchronization pulse serrations having a longer duration and equalizer pulses having a shorter duration, with the vertical pulse serrations and equalizer pulses having a repetition rate twice that of said horizontal synchronization pulses and with the leading edge of the first equalizer pulse being alternately in phase and 180° out of phase with the leading edges of said horizontal synchronization pulses on alternate occurrence of said intermittent pulses, the combination including, a differentiating circuit having a time constant no longer than said equalizer pulses for producing pulses of one polarity of coequal short duration at the leading edges of all said synchronization pulses, said differentiating means including condenser means and first resistor means connected in series across the synchronization signal deriving means, and rectifying means and second resistor means connected in series with each other and connected as a unit in series with said condenser means and in parallel with said first resistor means, said condenser means and said second resistor means having such values that the pulses produced across second resistor means at the leading edges of said synchronization pulses have a duration less than said equalizer pulses, said first resistor means having a value to discharge said condenser means between pulses, said rectifier eliminating the opposite polarity pulses produced at the lagging edges of said synchronization pulses, whereby pulses occurring at horizontal frequency are maintained during the occurrence of said intermittent pulses, and pulses having a repetition rate twice said horizontal frequency are of short duration, a sine wave oscillator having a natural frequency equal to the frequency of said horizontal synchronization pulses, means coupling said oscillator to said second resistor for locking said oscillator with the pulses of horizontal frequency, and second differentiating means connected to said sine wave oscillator for producing a pulse wave including pulses occurring at horizontal frequency only.

KURT SCHLESINGER.

REFERENCES CITED

The following references are of record in the file of this patent:

UNITED STATES PATENTS

| Number | Name | Date |
|---|---|---|
| 2,151,149 | Poch | Mar. 21, 1939 |
| 2,219,579 | Poch | Oct. 29, 1940 |
| 2,245,409 | Miller | June 10, 1941 |
| 2,529,172 | Moe | Nov. 7, 1950 |

FOREIGN PATENTS

| Number | Country | Date |
|---|---|---|
| 524,286 | Great Britain | Aug. 2, 1940 |